United States Patent
Demey et al.

(10) Patent No.: US 10,125,886 B2
(45) Date of Patent: Nov. 13, 2018

(54) MOUNTING ASSEMBLY FOR MOUNTING AN ADAPTER TO A VALVE STEM

(71) Applicant: Altachem NV, Deinze (BE)

(72) Inventors: Jordi Demey, Oeselgem (BE); Jean-Marie Poppe, Heule (BE)

(73) Assignee: ALTACHEM NV, Harelbeke (BE)

( * ) Notice: Subject to any disclaimer, the term of this patent is extended or adjusted under 35 U.S.C. 154(b) by 0 days.

(21) Appl. No.: 15/012,405

(22) Filed: Feb. 1, 2016

(65) Prior Publication Data

US 2016/0223097 A1    Aug. 4, 2016

(30) Foreign Application Priority Data

Feb. 2, 2015 (BE) .................................. 2015/5047

(51) Int. Cl.
| | |
|---|---|
| *F16K 27/06* | (2006.01) |
| *B65D 83/30* | (2006.01) |
| *B65D 83/20* | (2006.01) |
| *B65D 83/46* | (2006.01) |

(52) U.S. Cl.
CPC .......... *F16K 27/065* (2013.01); *B65D 83/201* (2013.01); *B65D 83/303* (2013.01); *B65D 83/46* (2013.01)

(58) Field of Classification Search
CPC ... F16K 27/065; B65D 83/201; B65D 83/303; B65D 83/46; B65D 41/16; B65D 41/04; B65D 51/1683; B65D 51/1644; B65D 51/1633; B65D 51/16; B65D 41/00; B65D 47/2031

USPC ...... 222/402.1, 153.14, 153.1; 220/288, 780, 220/315, 324, 325, 328; 215/276, 330
See application file for complete search history.

(56) References Cited

U.S. PATENT DOCUMENTS

| | | | | |
|---|---|---|---|---|
| 3,173,167 | A | * 3/1965 | Kaufman | B65D 83/285 |
| | | | | 401/190 |
| 3,450,316 | A | * 6/1969 | Barker | B65D 83/46 |
| | | | | 137/614.11 |
| 4,331,269 | A | * 5/1982 | Holman | B65D 83/306 |
| | | | | 222/402.21 |

(Continued)

FOREIGN PATENT DOCUMENTS

| | | |
|---|---|---|
| EE | 200800050 A | 4/2010 |
| EP | 0816254 A1 | 1/1998 |

(Continued)

OTHER PUBLICATIONS

Belgium Search Report from corresponding Application BE 201505047, dated Sep. 21, 2015.

*Primary Examiner* — Benjamin R Shaw
(74) *Attorney, Agent, or Firm* — Workman Nydegger

(57) ABSTRACT

A mounting assembly for mounting an adapter to a valve stem of a valve of a pressurized container for the application of foam, where the adapter is configured to be mounted by means of the female threaded element onto the male threaded element of the valve stem by means of an axial screwing movement up to the mounted position, wherein the adapter further comprises a locking element at the extreme upstream end that is configured, when mounting, under the effect of the axial screwing movement towards the mounted position, to move past the collar and secure the female threaded element in the mounted position.

20 Claims, 3 Drawing Sheets

(56) References Cited

U.S. PATENT DOCUMENTS

| | | | | | |
|---|---|---|---|---|---|
| 4,958,755 | A | * | 9/1990 | Gerstung | B65D 83/46 222/402.23 |
| 5,450,983 | A | * | 9/1995 | Stern | B05B 1/02 222/1 |
| 5,605,259 | A | * | 2/1997 | Clawson | B65D 83/285 222/192 |
| 6,152,335 | A | * | 11/2000 | Stern | B05B 1/02 222/394 |
| 7,222,758 | B1 | * | 5/2007 | Scheindel | B65D 83/46 222/402.13 |
| 7,374,068 | B2 | * | 5/2008 | Greer, Jr. | B65D 83/306 222/1 |
| 2006/0065678 | A1 | * | 3/2006 | McBroom | B65D 83/14 222/402.1 |
| 2013/0062369 | A1 | * | 3/2013 | Engel | B65D 83/201 222/402.15 |
| 2013/0320044 | A1 | * | 12/2013 | Hoagland | B05B 1/3046 222/402.1 |
| 2013/0320045 | A1 | * | 12/2013 | Hoagland | B05B 1/3046 222/402.13 |

FOREIGN PATENT DOCUMENTS

| | | |
|---|---|---|
| EP | 2354037 A1 | 8/2011 |
| EP | 2004520 B2 | 5/2013 |
| EP | 2743002 B1 | 4/2015 |
| WO | 2007112758 A2 | 10/2007 |
| WO | 2011144217 A1 | 11/2011 |

* cited by examiner

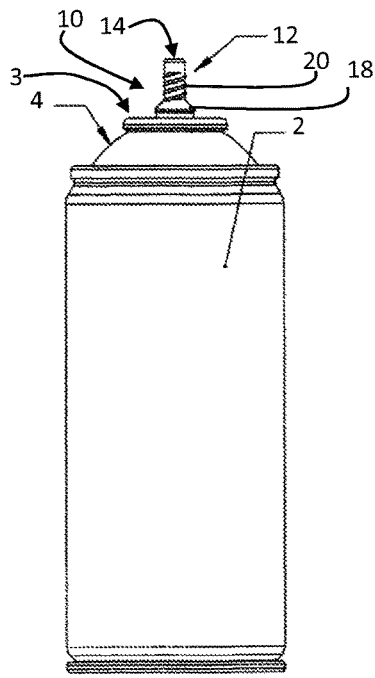
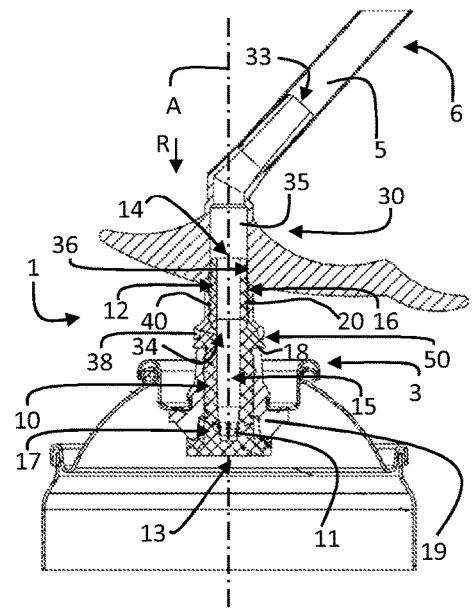
Fig 1
Fig 2
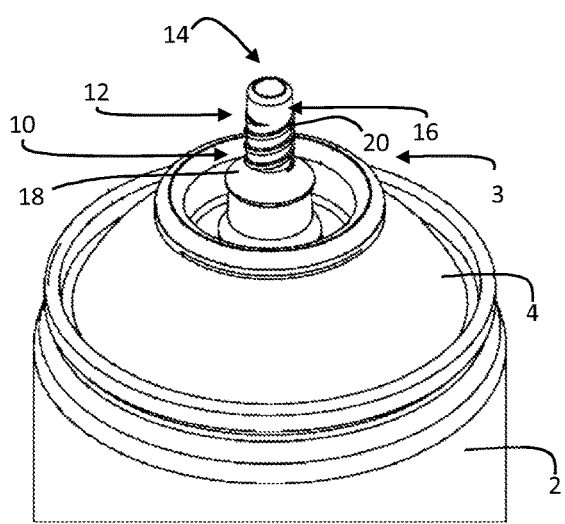
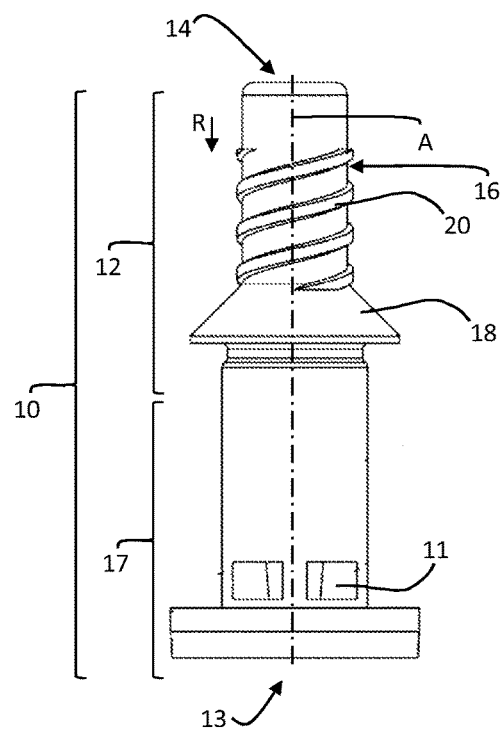
Fig 3
Fig 4

MOUNTING ASSEMBLY FOR MOUNTING AN ADAPTER TO A VALVE STEM

FIELD OF THE DISCLOSURE

The invention concerns a mounting assembly for mounting an adapter to a valve stem of a pressurized container for the application of foam, that is, the application of a foaming product, such as for example the application of polyurethane foam.

BACKGROUND

A container known from EP2354037 as pressurized container 2 for the application of polyurethane foam is for example shown in FIG. 1. This type of container 2 may contain for example a viscous foaming product or a liquid under pressure. According to the known example depicted in FIG. 1, the container 2 comprises a dome 4 in which a valve 3 is installed through which, when the valve 3 is opened, a flow of expanding foam will be released from the container 2. This type of container 2 is generally available for use in a variety of applications such as for example sprayable construction foams and insulation foams, more specifically polyurethane foams, and are for example used in industrial or do-it-yourself applications. As will be described in more detail, it is known that the valve 3 comprises a valve stem 10 that is installed via an opening in the dome, such that a passage will be opened, for example when the container makes a tilting motion through which the liquid can be released via the valve stem 10 from the pressurized container. In order to operate the valve 3, an adapter 30, as depicted in FIG. 2, is mounted to the valve 3 by means of an mounting device 1. As is generally known by a man skilled in the art, the foam is transported via the adapter 30 to for example an attached dispensing tube 6 in order to apply the foam at the desired location.

An embodiment of a mounting assembly is known from EP2004520 where an adapter, or an adapter connecting piece, is mounted to a valve stem by pressing in axial direction until hooks at the bottom of the adapter clipped onto the conical widening of the valve stem. This type of mounting assembly gives rise to the problem that when pressure is applied to mount the adapter onto the valve stem, there is the risk of the valve being moved to the open position, as a result of which foam is allowed to flow out before the adapter is clipped, which then results in undesirable leaking.

To counter this problem an alternative mounting assembly 1 known from EP2354037 is available, as depicted in FIGS. 1 and 2. This mounting assembly 1 for mounting an adapter 30 to a valve stem 10 of a valve 3 of a pressurized container 2 for applying a foaming product comprises, as depicted, the valve stem 10 and the adapter 30. The valve stem 10 is largely tubular and extends axially, that is, according to the indicated direction A formed by the central axis of the largely tubular structure of the valve stem, between a selectively closable intake opening 11 at an end 13 of the valve stem 10 that is located inside the container 2 and a discharge opening 14 formed by the opposing axially extreme downstream end 14 of the valve stem 10. With a tilting movement of the valve stem 10, for example by means of an adapter 30 mounted to it, the intake opening 11 is cleared and a stream of foam can flow out of the container 2 through the internal passage 15 of the largely tubular valve stem 10, and channeled through the internal passage 35 respectively of the adapter 30 and the internal channel 5 and the attached dispensing tube 6 further downstream to the location of the application of the foam. It is clear that the foam flows through an internal passage from the intake opening to a discharge opening of respectively the adapter 30 and subsequently the dispensing tube 6.

This valve stem 10 comprises, as depicted in the sectional view of FIG. 2, a tubular male mounting portion 12 positioned at the outside of container 2. This means that the mostly tubular valve stem 10 can be divided into two main elements according to the axial direction A of the internal passage 15, that is, a tubular male mounting portion 12 for the mounting of the adapter 30 that thus is available for that purpose at the side of the valve 3 positioned at the outside of the container 2, and an internal valve element 17 that extends through the valve 3 into the inside of the container 2. It is clear, as is depicted in FIG. 2, that the internal valve element 17 of the valve stem 10 is sealed in a known way from the outside of the container 2 with a suitable sealing element 19 with which for example it cooperates to enable the valve operation of the valve 3, as described in more detail in EP2354037.

This male mounting portion 12 of the valve stem 10, as depicted in FIGS. 1 and 2, extends tubularly according to the axial direction A at the outside of the valve 3 of the container 2 up to the extreme downstream end 14 that comprises the discharge opening of the valve stem 10. The male mounting portion 12 is tubular, meaning that its exterior wall 16 and its inner wall that creates the internal passage 15 have a central axis along the axial direction A. The male mounting portion 12 comprises a radially extending collar 18 at its exterior wall 16, that according to the embodiment shown has a conical design. It is clear that this collar 18 is axially positioned between the extreme downstream end 14 and the opposite extreme upstream end 13 of the valve stem 10, and further that it is positioned at the exterior side of the valve 3 and the container 2, and that it is positioned axially at the mounting portion 12 compared to the extreme downstream end 14 at a position closer to the intern valve element 17. Between this extreme downstream end 14 and the collar 18, the male mounting portion 12 comprises a male threaded element 20 in the form of for example a suitable screwthread 20 that is applied to the exterior wall 16 of the male mounting portion 12 at least a part of the axial zone between the extreme downstream end 14 and the radially extending collar 18 extending from exterior wall 16.

The adapter 30 from EP2354037 comprises an internal passage that extends from an extreme upstream end 34 up to the extreme downstream end 33. The adapter 30 comprises a female mounting portion 32 that is suited for the male mounting portion 12. The female mounting portion 32 also extends tubularly from the extreme downstream end 34 of the adapter 30. At the inner wall 36, the female mounting portion 32 comprises a female threaded element 40 that, as depicted in FIG. 2, is suited to screw onto the male threaded element 20 of the valve stem 10, by means of an axial screwing movement in the direction indicated with the arrow R. In this way, the adapter 30 is mounted to the valve stem 10, by means of the axial screwing movement of both corresponding screw elements 20, 40 until the mounted position 50 is reached as depicted in FIG. 2. As known from the embodiments in for example EP2354037, and as depicted in FIG. 2, the collar 18 is positioned such that it limits the axial screwing movement up to mounted position 50. According to the embodiment shown, this means that at the end of the screwing movement, when reaching the mounted position 50, the adapter 30 with a radial widening 38 at its inner wall 36 near the extreme upstream end 34 sits against the collar 18 of the male mounting portion 12. The mounting by means of the axial screwing movement avoids the risk that an axial force on the valve 3 in the direction R is exerted during the mounting of the adapter 30 which would be large enough to move the valve 3 away from its closed position and would for example clear one or more inlet openings 11. However, this kind of mounting assembly 1 may give rise to another problem, especially in a context such as for example known from EP2743002 where the downstream end of the dispensing tube 6 may be closed off. In such a case, there is a risk that, for example as the result of increased pressure in the closed dispensing tube 6 and adapter 30, the adapter may 30 inadvertently unscrew itself from the mounted position 50 as a result of which the closure of the screwed connection is no sealed and could allow inadvertent leaks.

There thus exists a need for an improved mounting assembly that solves the problems described above and that reduces the risk of the mounting assembly coming loose while in the mounted position, without increasing the risk of leakage when mounting the adapter.

SUMMARY

For this purpose, according to a first aspect of the invention, there is provided a mounting assembly (1) for mounting an adapter (30) to a valve stem (10) of a valve (3) of a pressurized container (2) for applying a foaming product, the mounting assembly (1) comprising:

the valve stem (10) comprising a male mounting portion (12) that extends tubularly up to the extreme downstream end (14) of the valve stem (10), and comprising at its outer wall (16):
  a radially extending collar (18) positioned axially upstream relative to the extreme downstream end (14); and
  a male threaded element (20) positioned axially between the collar (18) and the extreme downstream end (14); and the adapter (30) comprising a female mounting portion (32) that extends tubularly from an extreme upstream end (34) of the adapter (30), and the female mounting portion (32) at its inner wall (36) comprising a female threaded element (40), wherein the adapter (30) is configured to be mounted by means of the female threaded element (40) onto the male threaded element (20) of the valve stem (10) by means of an axial screwing movement up to the mounted position (50), wherein the adapter (30) further comprises a locking element (60) at the extreme upstream end (34) that is configured, when mounting, under the effect of the axial screwing movement towards the mounted position (50), to move past the collar (18) and secure the female threaded element (40) in the mounted position (50).

In this way, a mounting assembly is realized that reduces the risk of the mounting assembly coming loose while in mounted position by means of the locking element, while not increasing the risk of leakage while mounting the adapter, since the mounting of the adapter takes place by means of an axial screwing movement.

The collar is, according to an embodiment, configured in such a way that it limits the axial screwing movement up to the mounted position.

In this manner the screwed joint is limited in a simple way that is compatible with existing male mounting portions of the valve stem. This also ensures that the mounted position is established in a robust manner. This means that at the end of the screwing movement, a correct relative position of the upstream end of the male mounting portion of the valve stem in the adapter can be guaranteed. Correct positioning of the upstream end of the male mounting portion in the inner passage of the adapter is important for guaranteeing a well-sealed connection between the adapter and the valve stem. The collar on one hand serves as a visual reference, ensuring that the user screws the adapter sufficiently far onto the valve stem in order to achieve a well-sealed position. Additionally, the collar ensures that the user cannot screw the adapter too far onto the valve stem, which could cause adverse deformation or damage to the adapter or valve stem.

According to another embodiment, the adapter further comprises a radial widening at its inner wall that is positioned axially between the female threaded element and the extreme upstream end, and that is configured to at least partially enclose the collar when it is in the mounted position.

In this manner, a simple mounting assembly is realized that will remain compatible with existing male mounting portions of the valve stem.

According to another embodiment, the radial widening is positioned axially between the locking element and the female threaded element.

This allows for a simple application of the locking element to the adapter near the most downstream end, in a manner that will remain compatible with existing male mounting portions of the valve stem.

According to another embodiment, the collar comprises a radial top where a maximum radial distance Rmax of the collar to the central axis A of the male mounting portion is reached; and in the mounted position:
  the locking element is positioned axially downstream relative to the radial top; and
  the locking element thereby extends radially in the direction of the central axis of the male mounting portion up to a minimum radial distance to the central axis which is smaller than the maximum radial distance.

This allows for a simple realization of a locking element.

According to another embodiment, the minimum radial distance of the locking element is in the range of 85-99% of the maximum radial distance of the radial top.

In this manner, a locking element can be realized that allows the screwed joint to be sufficiently locked, while the locking element can easily be moved past the radial top with the axial screwing movement while mounting.

According to a second aspect of the invention, an adapter is provided for use in a mounting assembly according to the first aspect of the invention, wherein the adapter further comprises a locking element at the extreme upstream end that is configured, when mounting, under the effect of the axial screwing movement towards the mounted position, to move past the collar and secure the female threaded part in the mounted position.

According to a third aspect of the invention, a method is provided for mounting the adapter on a valve stem of a mounting assembly according to the first aspect of the invention; wherein, when mounting, it in an axial screwing movement towards the mounted position, the locking element moves past the collar and secures the female threaded element in the mounted position.

BRIEF DESCRIPTION OF THE DRAWINGS

The invention will now be described in further detail with reference to the exemplary embodiments shown in the Figures, in which:

FIG. 1 schematically shows an embodiment of a pressurized container for the application of foam with a valve stem of a valve;

FIG. 2 schematically shows a known mounting assembly from EP2354037;

FIGS. 3 and 4 show the valve and the valve stem of FIG. 1 in greater detail;

DETAILED DESCRIPTION OF VARIOUS EMBODIMENTS

Figure 5:
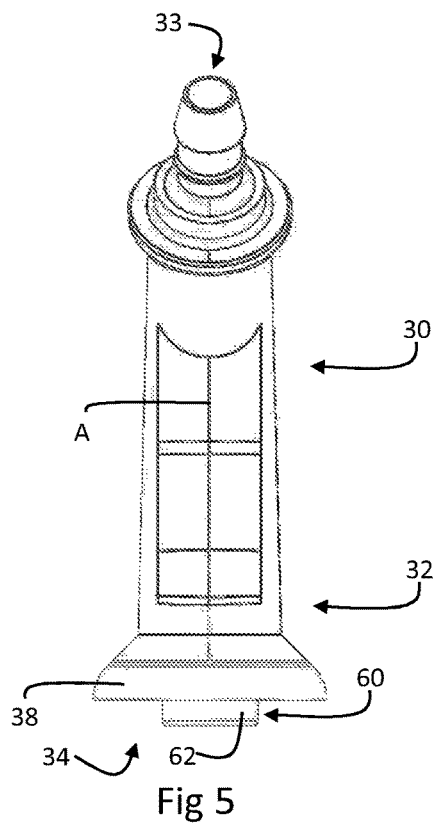
FIGS. 5 to 7 show different views of an embodiment of an adapter for use in the embodiment of the mounting assembly as depicted in FIGS. 8 and 9.

As will further be described with reference to FIG. 8, an embodiment of the mounting assembly 1 comprises a valve stem 10 and an adapter 30 with a large number of similar elements as known from, for example, EP2354037 and depicted in FIG. 2. Similar elements will be marked with the same references and will only be described to the extent that this is necessary for the improved operation of the mounting assembly 1. Reference is made to the description mentioned above for additional details related to the known elements, and EP2354037 is hereby incorporated by reference, especially with respect to the already known elements and their function in mounting assembly 1, this means in particular the pressurized container 2, its valve 3 and the valve stem 10 of this valve 3, and the elements of the adapter 30 with similar references as in FIG. 2. As depicted in FIGS. 1, 3 and 4, this embodiment of the valve stem 10 of the valve 3 of the container 2 comprises a male mounting portion 12. This male mounting portion 12 extends out tubularly at the outside of the container 2 up to the extreme downstream end 14 of the valve stem 10. The internal valve element 17 of the valve stem 10 that extends to the inside of the container 2 up to the extreme downstream end 13 of the valve stem 10, is clearly depicted in FIG. 4. As indicated above, the inner wall of the valve stem 10 forms a passage for the foam that extends substantially cylindrically according to axial direction A, formed by the central axis of this internal passage. This internal passage extends from the extreme upstream end through the internal valve element 17 and then through the male mounting portion 12 to the extreme downstream end 14 of the valve stem 10. In addition, it is shown that the male mounting portion 12 comprises a male screwthread 20 at its exterior wall 16, upstream of the extreme downstream end 14, along axial direction A, and additionally a radially extending collar 18 positioned even further axially upstream. According to the depicted exemplary embodiment design, the collar has a conical design, as will be described in further detail, and for example as known from EP2354037. The male threaded element 20 is, as depicted, embodied as a suitable external thread 20 that allows an axial screwing movement in order to mount adapter 30 along the axial direction as depicted with arrow R in FIG. 4, that is, along the direction from the extreme downstream end 14 towards the collar 18. The male threaded element 20 that is positioned axially between the collar 18 and the extreme downstream end 14 does not have to extend completely to the far downstream end 14. It can be advantageous not to provide this external screwthread 20 at the male mounting portion 12 near the far downstream end 14 of the valve stem 10 in order to enable a certain amount of initial axial alignment of the central axis of the adapter 30 with the central axis of the male mounting portion 12 before the screwing movement is started.

Figure 6:
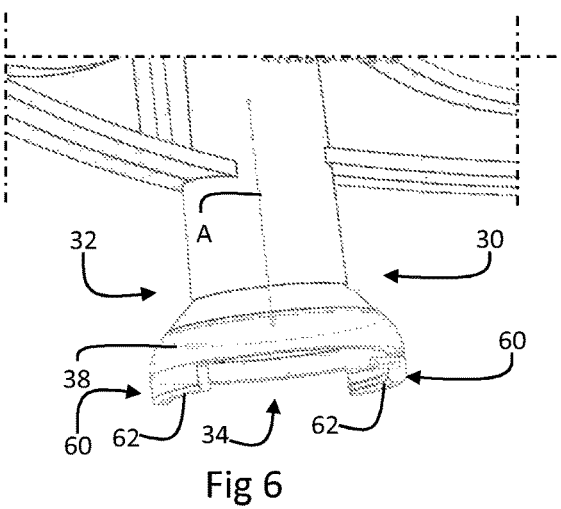
Figure 7:
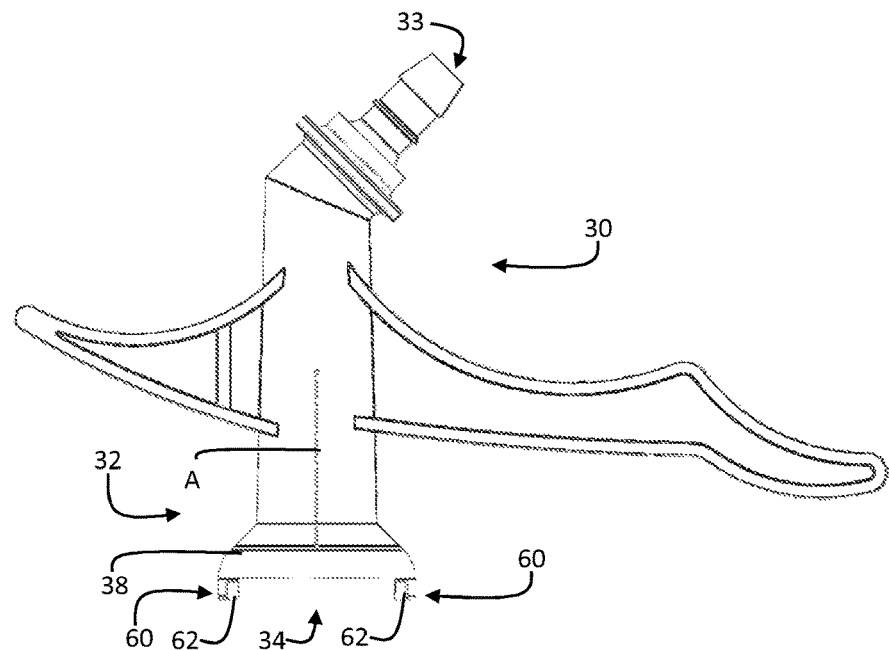
Figure 8:
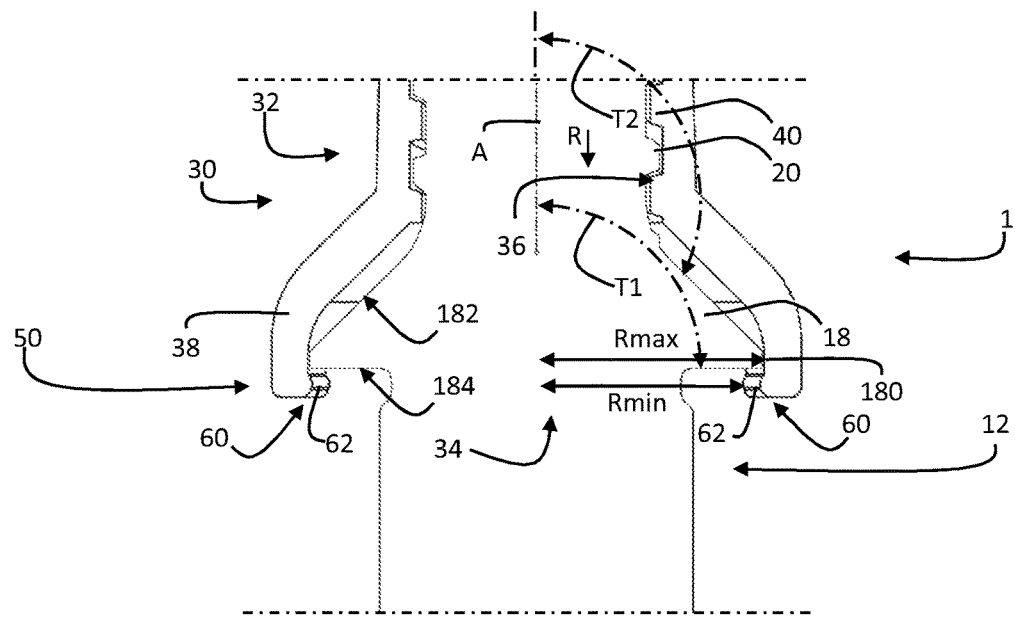
FIG. 8 schematically shows an embodiment of a mounting assembly that uses an embodiment of the valve stem depicted in FIGS. 3 and 4 and the embodiment of the adapter depicted in FIGS. 5 to 7.

As depicted in the front view of FIG. 5, the perspective view of FIG. 6 and the side view of FIG. 7 of the embodiment of the adapter 30 for the mounting assembly 1 depicted in FIG. 8, that provides a cross-sectional view of the adapter 30, the adapter 30 comprises, similar as described above with respect to FIG. 2, a female mounting portion 32 that extends tubularly from the extreme upstream end 34 of the adapter 30 along axial direction A. As is most clearly seen in FIG. 8, this female mounting portion 32 comprises at its inner wall 36 a female threaded element 40 in the form of a suitable internal screwthread 40. It is clear that the inner wall of the tubular female mounting portion 32 is suited to receive the exterior wall of the tubular male mounting portion 12 as depicted in FIG. 8, and thus to mount adapter 30 on the valve stem 10. It is clear that the adapter 30, by means of the female threaded element 40, can be mounted onto the male threaded element 20 of the valve stem 10 by means of an axial screwing movement, that is, a screwing movement along axial direction A indicated by the arrow R. This screwing movement is continued during the mounting until the mounted position 50 has been reached for the mounting assembly 1 as depicted in FIG. 8.

As is most clearly seen in FIGS. 5 to 8, this embodiment of the adapter 30 comprises in addition to the known elements, the locking element 60 at the extreme upstream end 34. This locking element 60, according to this embodiment, is formed by two inwards facing hooks 62 mounted at the extreme upstream end of the adapter 30. It is clear that under the effect of the axial screwing movement in the direction of arrow R towards the mounted position 50, these hooks can move past the collar 18. In the depicted mounted position 50, they secure the female threaded element 40, meaning that they provide extra resistance under a possible tendency to unscrew the screwed joint between the corresponding threaded elements 20 40, since the inward facing hooks 62 hook onto the downstream side of the radial collar 18. In addition, it is clear that according to the depicted exemplary embodiment, the axial screwing movement is limited by the radial collar 18 when the mounted position 50 has been reached.

Adapter 30 comprises, according to the exemplary embodiment of FIGS. 5 to 8, a radial widening 38 that is positioned axially between the locking element 60 and the female threaded element 40. Alternative embodiments however are possible, for example where the locking element 60 is connected to threaded element 40 at a different location or in a different manner, such that it moves together with it during the axial screwing movement. This radial widening 38 is, as indicated, applied at the inner wall 36 of the female mounting portion 32 of the adapter 30 and the radial widening 38 partially encloses the collar 18 in the mounted position 50, in particular the downstream end of the collar 18.

The radial collar 18 comprises, as indicated in FIG. 8, a downstream side 182 at the side of threaded element 40 and the extreme downstream end 14 of the male mounting portion 12, then a radial top 180 that reaches a maximum radial distance Rmax of the collar 18 to the central axis A of the male mounting portion 12, and finally a nearly radial upstream side 184. That the upstream side 184 is radial or nearly radial, that is, almost perpendicular to the axial direction A, or with a limited deviation thereof, for example less than 10°, is advantageous, because this maximizes the locking effect of the locking element 60, that is, the inward facing hooks 62.

This means, under an angle T1, as depicted in FIG. 8, in the range of 80° to 100° in relation to the axial direction A. It is on the other hand also advantageous if the downstream side 182 as shown has a greater deviation from the radial direction, e.g. an angle larger than 25° relative to the direction perpendicular to axial direction A, because this reduces the resistance caused by the guiding of the inward hooks 62 during the axial screwing movement towards the mounted position 50, and eases the moving of the locking element past the radial top 180 of the radial collar 18. Tis means, an angle T2, as shown in FIG. 8, of more than 155° in relation to the axial direction A. The surface of the downstream side 182 of the collar 18 preferably is conical, as such a surface is easy to manufacture and creates a continuous guiding surface for the locking element during the axial screwing movement of the mounting portions 12, 32.

As is further shown in FIG. 8, it is clear that when the mounted position 50 is reached, the radial inwards facing hooks 62 of the locking element 60 are positioned axially upstream relative to the radial top 180. This means that the hooks 62 of the locking element 60 thereby extend radially in the direction of the central axis A of the male mounting portion 12 up to a minimum radial distance Rmin to the central axis which is smaller than the maximum radial distance Rmax of the radial top 180. As shown, the radial inwards facing hooks 62 of the locking element are of a sufficient size to enable the desired locking with the upstream side 184 of the collar 18, yet they are not too large to be easily screwed past the downstream side 182 of the radial top. The minimum radial distance Rmin of the locking element 60 can for example be selected from the range of 85% to 99% of the maximum radial distance of the radial top 180. It is furthermore also advantageous if the locking element 60 and the nearby elements of the female mounting portion 32 such as the radial widening 38, preferably all manufactured from the same material as the adapter 30, comprise suitable elastic properties to endure the radial deformation when being mounted without plastic deformation. This may be a suitable synthetic material, preferably a polyolefin, for example polypropylene, since this type of material yields good resilient properties and reduces the risk of permanent deformation. It is clear however that other similarly suitable materials may be used as well.

Figure 9:
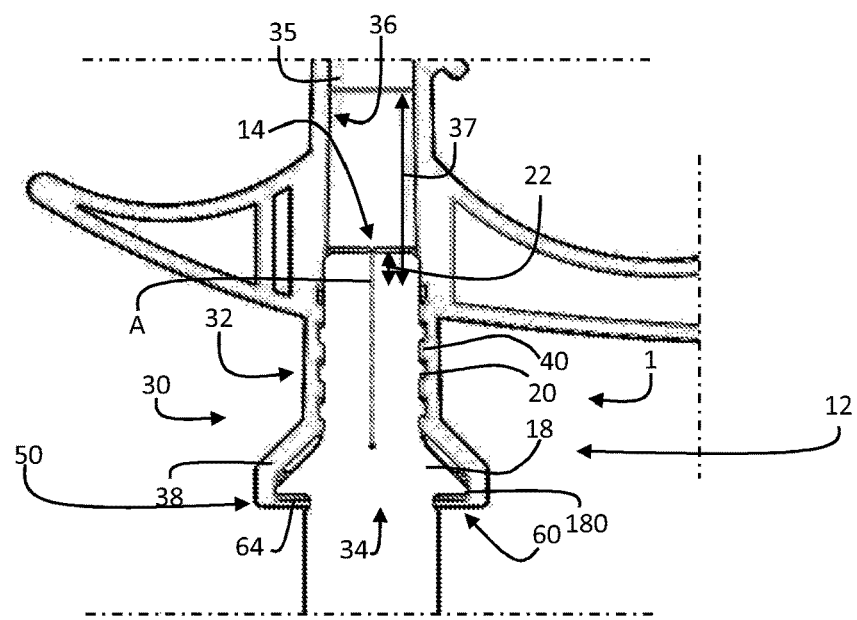
FIG. 9 schematically shows an alternative embodiment of a mounting assembly similar to FIG. 8.

FIG. 9 depicts an alternative embodiment of the mounting assembly 1 similar to FIG. 8, with the difference that the locking element 60, instead of two opposing radial hooks, is formed by a continuous inwards radial ring 64 positioned around the full circumference of the interior wall of the female mounting portion 32. It is clear that multiple alternative embodiment of the locking element 60 are possible, for example with different hooks 62, alternative embodiments of the radial inward-oriented elements, other than the hooks and rings that were described above, etc.

According to the exemplary embodiment depicted in FIG. 9, the internal passage 35 of the inner wall 36 of the female mounting portion 32 of the adapter 30 comprises an inner conical zone 37. This inner conical zone 37, as shown, extends, in the mounted position, axially near the extreme downstream end 14 of the male mounting portion 12, more particularly near the axial zone 22 of the male mounting portion 12 between this extreme downstream end 14 and the male threaded element 20 that does not have an outer screwthread. The inner conical zone 37 has a surface with a small angle relative to axial direction A, for example with an angle in the range of 1° to 10°, for example 2° of 3°. The diameter of this inner conical zone 37 thereby reduces in downstream direction, and it is such that in the mounted position 50 at the level of axial zone 22, it becomes smaller than the outer diameter of the male mounting portion 12 in order to achieve a good sealing and to prevent leaks between the adapter 30 and the valve stem 10. It is clear that such a sealing can also be achieved with alternative embodiments, for example as described above.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the ones described or illustrated above.

The invention claimed is:

1. A mounting assembly for mounting an adapter to a valve stem of a valve of a pressurized container for applying a foaming product, the mounting assembly comprising:
   the valve stem comprising a male mounting portion that extends tubularly up to the extreme downstream end of the valve stem, and comprising at its outer wall:
   a radially extending collar positioned axially upstream relative to the extreme downstream end, the collar including a radial top where a maximum radial distance (Rmax) of the collar to a central axis of the male mounting portion is reached; and
   a male threaded element positioned axially between the collar and the extreme downstream end; and
   the adapter comprising a female mounting portion that extends tubularly from an extreme upstream end of the adapter, and the female mounting portion at its inner wall comprising a female threaded element;
   wherein the adapter is configured to be mounted by means of the female threaded element onto the male threaded element of the valve stem by means of an axial screwing movement up to the mounted position;
   wherein the adapter further comprises a locking element at the extreme upstream end that is configured, when mounting, under the effect of the axial screwing movement towards the mounted position, to move past the collar and secure the female threaded element in the mounted position, and in the mounted position, the locking element extends radially in the direction toward the central axis of the male mounting portion at a minimum radial distance (Rmin) to the central axis, the minimum radial distance (Rmin) being within the range of 85% to 99% of the maximum radial distance (Rmax); and wherein the mounting assembly reduces a risk of the mounting assembly coming loose while in the mounted position by means of the locking element, while not increasing a risk of leakage while mounting the adapter due to the mounting assembly being configured such that mounting of the adapter takes place by means of the axial screwing movement.

2. A mounting assembly according to claim 1, wherein the collar is configured in such a way that it limits the axial screwing movement up to the mounted position.

3. A mounting assembly according to claim 1, wherein the adapter further comprises a radial widening at its inner wall that is positioned axially between the female threaded element and the extreme upstream end, and that is configured to at least partially enclose the collar when it is in the mounted position.

4. A mounting assembly according to claim 3, wherein the radial widening is positioned axially between the locking element and the female threaded element.

5. A mounting assembly according to claim 4, wherein, in the mounted position:
the locking element is positioned axially upstream relative to the radial top.

6. A method for mounting an adapter on a valve stem of a mounting assembly, the method comprising:
providing the mounting assembly that comprises
the valve stem comprising a male mounting portion that extends tubularly up to the extreme downstream end of the valve stem, and comprising at its outer wall:
a radially extending collar positioned axially upstream relative to the extreme downstream end, the collar including a radial top where a maximum radial distance (Rmax) of the collar to a central axis of the male mounting portion is reached; and
a male threaded element positioned axially between the collar and the extreme downstream end; and
providing the adapter that comprises a female mounting portion that extends tubularly from an extreme upstream end of the adapter, and the female mounting portion at its inner wall comprising a female threaded element;
wherein the adapter is configured to be mounted by means of the female threaded element onto the male threaded element of the valve stem by means of an axial screwing movement up to the mounted position;
wherein the adapter further comprises a locking element at the extreme upstream end that is configured, when mounting, under the effect of the axial screwing movement towards the mounted position, to move past the collar and secure the female threaded element in the mounted position; and
wherein, when mounting, under the effect of the axial screwing movement towards the mounted position, the locking element moves past the collar and secures the female threaded element in the mounted position, and in the mounted position, the locking element extends radially in the direction toward the central axis of the male mounting portion at a minimum radial distance (Rmin) to the central axis, the minimum radial distance (Rmin) being within the range of 85% to 99% of the maximum radial distance (Rmax); and wherein the mounting assembly reduces a risk of the mounting assembly coming loose while in the mounted position by means of the locking element, while not increasing a risk of leakage while mounting the adapter due to the mounting assembly being configured such that mounting of the adapter takes place by means of the axial screwing movement.

7. The method according to claim 6, wherein the collar is configured in such a way that it limits the axial screwing movement up to the mounted position.

8. The method according to claim 6, wherein the adapter further comprises a radial widening at its inner wall that is positioned axially between the female threaded element and the extreme upstream end, and that is configured to at least partially enclose the collar when it is in the mounted position.

9. The method according to claim 6, wherein the radial widening is positioned axially between the locking element and the female threaded element.

10. The method according to claim 9, wherein, in the mounted position, the locking element is positioned axially upstream relative to the radial top.

11. The mounting assembly according to claim 1, wherein the female mounting portion includes an inner conical zone arranged downstream from the female threaded element, the inner conical zone having an inner surface with an angle relative to the central axis of the male mounting portion such that the diameter of the inner conical zone reduces in the downstream direction.

12. The mounting assembly according to claim 11, wherein at least at a portion of the inner surface of the inner conical zone, the inner diameter of the conical zone is less than a outer diameter of the male mounting portion at a corresponding portion along the central axis to provide a sealing point that prevents leaks between the adapter and the valve stem.

13. The mounting assembly according to claim 11, wherein the angle of the inner surface relative to the central axis of the male mounting portion is 1° to 10°.

14. The mounting assembly according to claim 11, wherein the angle of the inner surface relative to the central axis of the male mounting portion is 2° or 3°.

15. The mounting assembly according to claim 1, wherein the locking element includes two inward facing opposing radial hooks, with a radial gap provided between each of the hooks.

16. The mounting assembly according to claim 1, wherein the locking element includes a continuous inward-projecting radial ring around the full circumference of the interior wall of the female mounting portion.

17. A mounting assembly for mounting an adapter to a valve stem of a valve of a pressurized container for applying a foaming product, the mounting assembly comprising:
the valve stem comprising a male mounting portion that extends tubularly up to the extreme downstream end of the valve stem, and comprising at its outer wall:
a radially extending collar positioned axially upstream relative to the extreme downstream end; and
a male threaded element positioned axially between the collar and the extreme downstream end; and
the adapter comprising a female mounting portion that extends tubularly from an extreme upstream end of the adapter, and the female mounting portion at its inner wall comprising a female threaded element;

wherein the adapter is configured to be mounted by means of the female threaded element onto the male threaded element of the valve stem by means of an axial screwing movement up to the mounted position;

wherein the adapter further comprises a locking element at the extreme upstream end that is configured, when mounting, under the effect of the axial screwing movement towards the mounted position, to move past the collar and secure the female threaded element in the mounted position; and wherein the mounting assembly reduces a risk of the mounting assembly coming loose while in the mounted position by means of the locking element, while not increasing a risk of leakage while mounting the adapter due to the mounting assembly being configured such that mounting of the adapter takes place by means of the axial screwing movement, wherein the female mounting portion includes an inner conical zone arranged downstream from the female threaded element, the inner conical zone having an inner surface with an angle relative to a central axis of the male mounting portion such that the diameter of the inner conical zone reduces in the downstream direction.

18. The mounting assembly according to claim 17, wherein at least at a portion of the inner surface of the inner conical zone, the inner diameter of the conical zone is less than a outer diameter of the male mounting portion at a corresponding portion along the central axis to provide a sealing point that prevents leaks between the adapter and the valve stem.

19. The mounting assembly according to claim 17, wherein the angle of the inner surface relative to the central axis of the male mounting portion is 1° to 10°.

20. The mounting assembly according to claim 17, wherein the angle of the inner surface relative to the central axis of the male mounting portion is 2° or 3°.

* * * * *